A US010787377B2

(12) United States Patent
Jowett et al.

(10) Patent No.: US 10,787,377 B2
(45) Date of Patent: Sep. 29, 2020

(54) REMOVAL OF PHOSPHORUS FROM SEWAGE BY ELECTRODE METAL ADDITION

(71) Applicant: Waterloo Biofilter Systems Inc., Rockwood (CA)

(72) Inventors: Edwin Craig Jowett, Rockwood, CA (US); Yanqing Xu, Woodridge, IL (US)

(73) Assignee: WATERLOO BIOFILTER SYSTEMS INC., Rockwood, Ontario (CA)

(*) Notice: Subject to any disclaimer, the term of this patent is extended or adjusted under 35 U.S.C. 154(b) by 100 days.

(21) Appl. No.: 15/495,422

(22) Filed: Apr. 24, 2017

(65) Prior Publication Data

US 2017/0225975 A1    Aug. 10, 2017

Related U.S. Application Data

(62) Division of application No. 13/931,048, filed on Jun. 28, 2013, now abandoned.

(30) Foreign Application Priority Data

Jun. 28, 2012  (GB) .................................. 1211668.7
Jun. 29, 2012  (GB) .................................. 1211681.0

(51) Int. Cl.
C02F 1/463      (2006.01)
C02F 1/467      (2006.01)
(Continued)

(52) U.S. Cl.
CPC ............ C02F 1/463 (2013.01); C02F 1/4676 (2013.01); C02F 1/58 (2013.01); C02F 3/005 (2013.01);
(Continued)

(58) Field of Classification Search
None
See application file for complete search history.

(56) References Cited

U.S. PATENT DOCUMENTS 3,766,045 A * 10/1973 Itakura ................ C02F 1/46109
                                                    204/278.5
4,123,339 A    10/1978 Gale et al.
(Continued)

FOREIGN PATENT DOCUMENTS

JP    2000084584 A    3/2000
JP    2003290773 A    10/2013

OTHER PUBLICATIONS

JP2003290773 Maruyama—Ionization Cleaning Device [Abstract, Machine translation & Original; Oct. 14, 2003].
(Continued)

*Primary Examiner* — Hayden Brewster
(74) *Attorney, Agent, or Firm* — Phillip C. Mendes da Costa; Bereskin & Parr LLP/ S.E.N.C.R.L., s.r.l.

(57) ABSTRACT

In an apparatus for treating wastewater, e.g sewage water, the water passes through a standard treatment process stream to promote production of dissolved reactive phosphate ions (PO4). Iron (or aluminum) ions are generated by electrochemical means and added to the process stream at one or more locations to produce metal-P coagulant solids removed in part by pump-out, with the substantial remaining P removed by mineralization and filtration in a biological filter such as a sand filter or leach field. In another apparatus, the water passes through a standard aerobic treatment process stream to promote production of dissolved reactive phosphate ions. Iron (or aluminum) ions are generated by electrochemical means and added to the process stream at one or more locations to produce a flocculant of Fe—P minerals that are separated out by sedimentation, physical filtration or magnetic means.

9 Claims, 5 Drawing Sheets

(51) Int. Cl.
*C02F 1/58* (2006.01)
*C02F 1/461* (2006.01)
*C02F 3/06* (2006.01)
*C02F 3/12* (2006.01)
*C02F 3/00* (2006.01)
C02F 101/10 (2006.01)
C02F 103/00 (2006.01)

(52) U.S. Cl.
CPC .............. *C02F 3/06* (2013.01); *C02F 3/1242* (2013.01); *C02F 2001/46133* (2013.01); *C02F 2101/105* (2013.01); *C02F 2103/005* (2013.01); *Y02W 10/15* (2015.05); *Y02W 10/37* (2015.05)

(56) References Cited

U.S. PATENT DOCUMENTS

| | | | |
|---|---|---|---|
| 4,880,510 | A | 11/1989 | Uhrich |
| 6,406,629 | B1* | 6/2002 | Husain .................. C02F 3/1268 210/605 |
| 6,645,366 | B2 | 11/2003 | Iseki et al. |
| 6,719,893 | B2 | 4/2004 | Sakakibara |
| 8,143,471 | B2 | 3/2012 | Fan |
| 2002/0056674 | A1* | 5/2002 | Iseki ...................... C02F 1/463 210/143 |
| 2002/0189996 | A1* | 12/2002 | Bellamy .................. C02F 3/10 210/601 |
| 2005/0109695 | A1 | 5/2005 | Olivier |
| 2012/0085702 | A1* | 4/2012 | Jowett .................. C02F 3/2806 210/606 |
| 2013/0256234 | A1 | 10/2013 | Miller et al. |

OTHER PUBLICATIONS

JP2000084584 Fujimoto etal.—WW Treatment Device for Phosphoric Acid Ion Containing Wastewater [Abstract & Machine translation; Mar. 28, 2000].

Effective Phosphorus Removal by Adding Alum to Septic Tank by Marek Brandes—vol. 29, No. 11 (Nov. 1977).

EPA Onsite Wastewater Treatment Systems Technolgy Fact Sheet 8 "Enhanced Nutrient Removal—Phosphorus" Author and publication date unknown.

Arsenic Removal From Drinking Water by Flocculation and Microfiltration by Binbing Han, et al. pub.by Dept. of Chemical Engineering, Colorado State University date unknown.

Anaerobic Control of Phosphate by Ferrous Iron by Philip Singer published by Water Pollution Control Federation in Apr. 1972.

Brochure "Shark Grinder Pumps" by Roger Lacasse Onsite Wastewater Conference & Exhibition (date unknown).

Review of Phosphate Mobility and Persistence in 1 O Septic System Plumes by W.D.Robertson, et al. Ground Water publication Nov.-Dec. 1998.

* cited by examiner

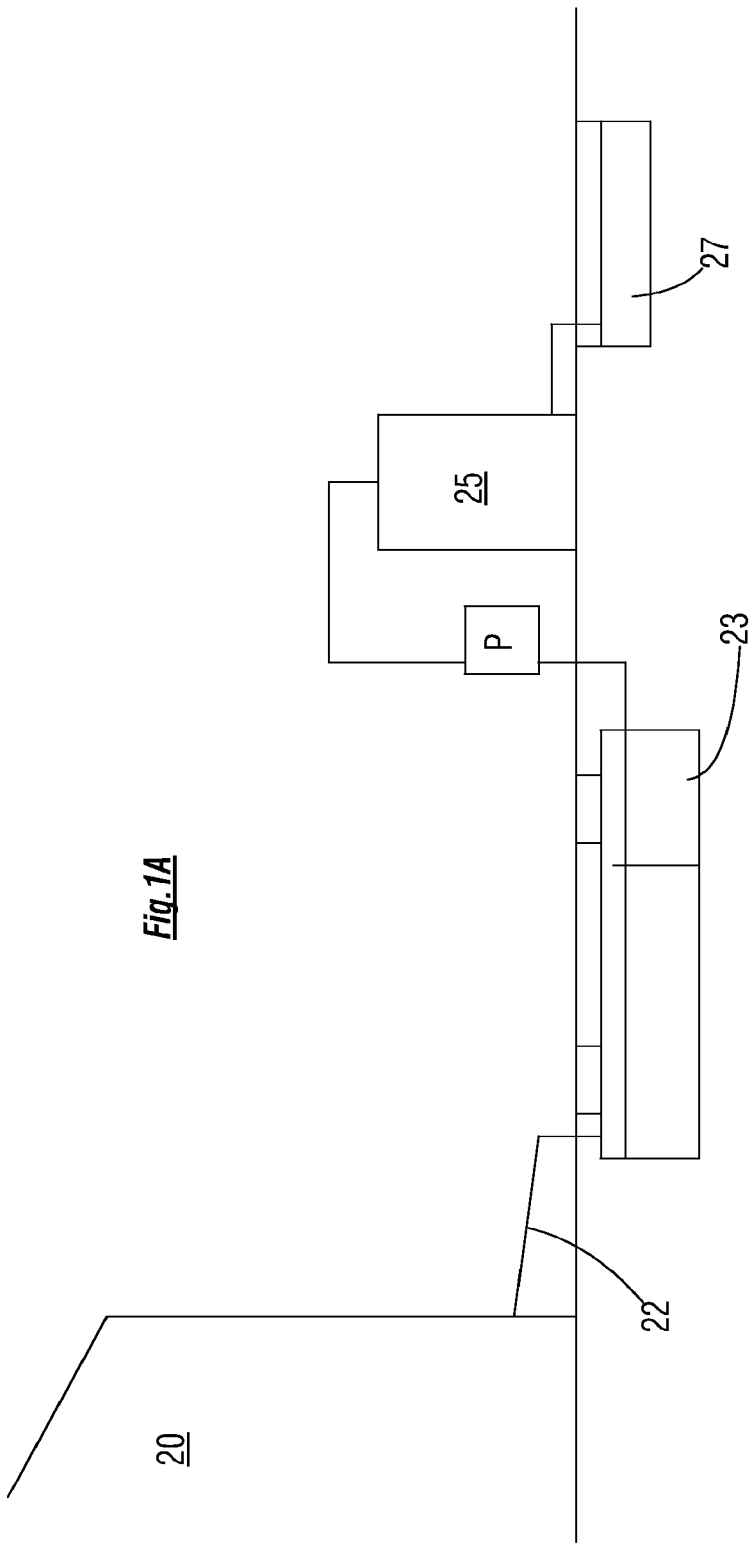

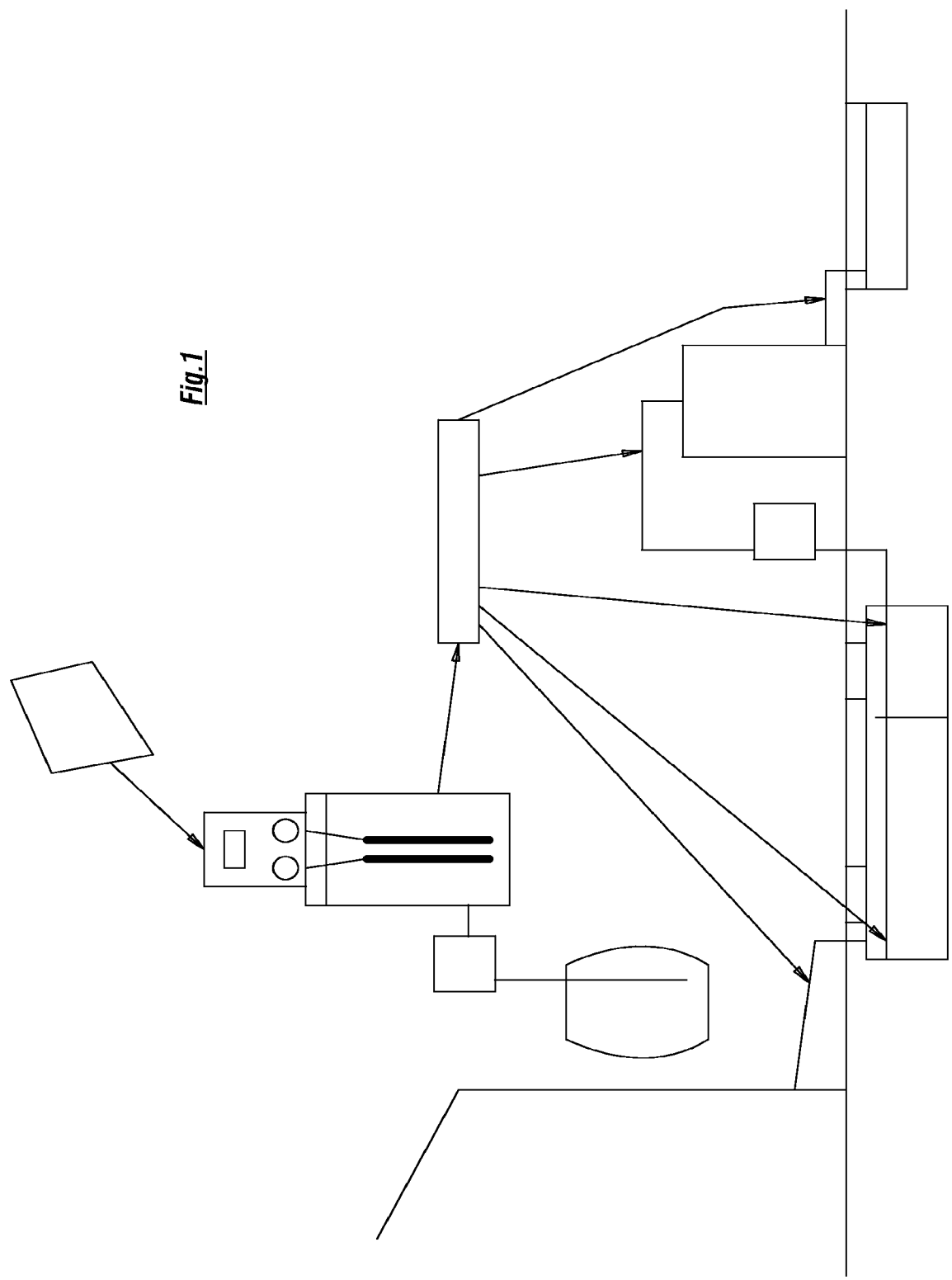

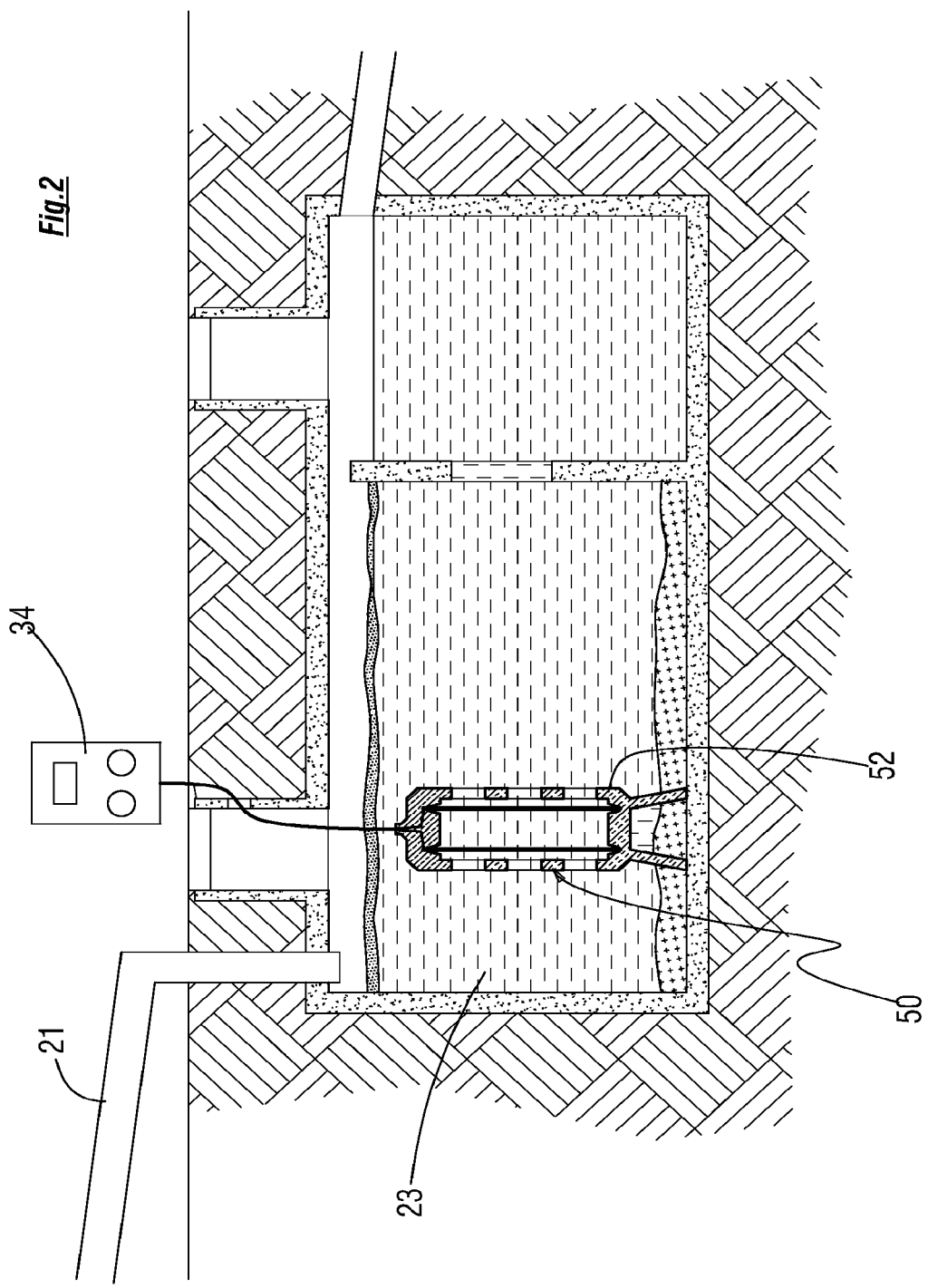

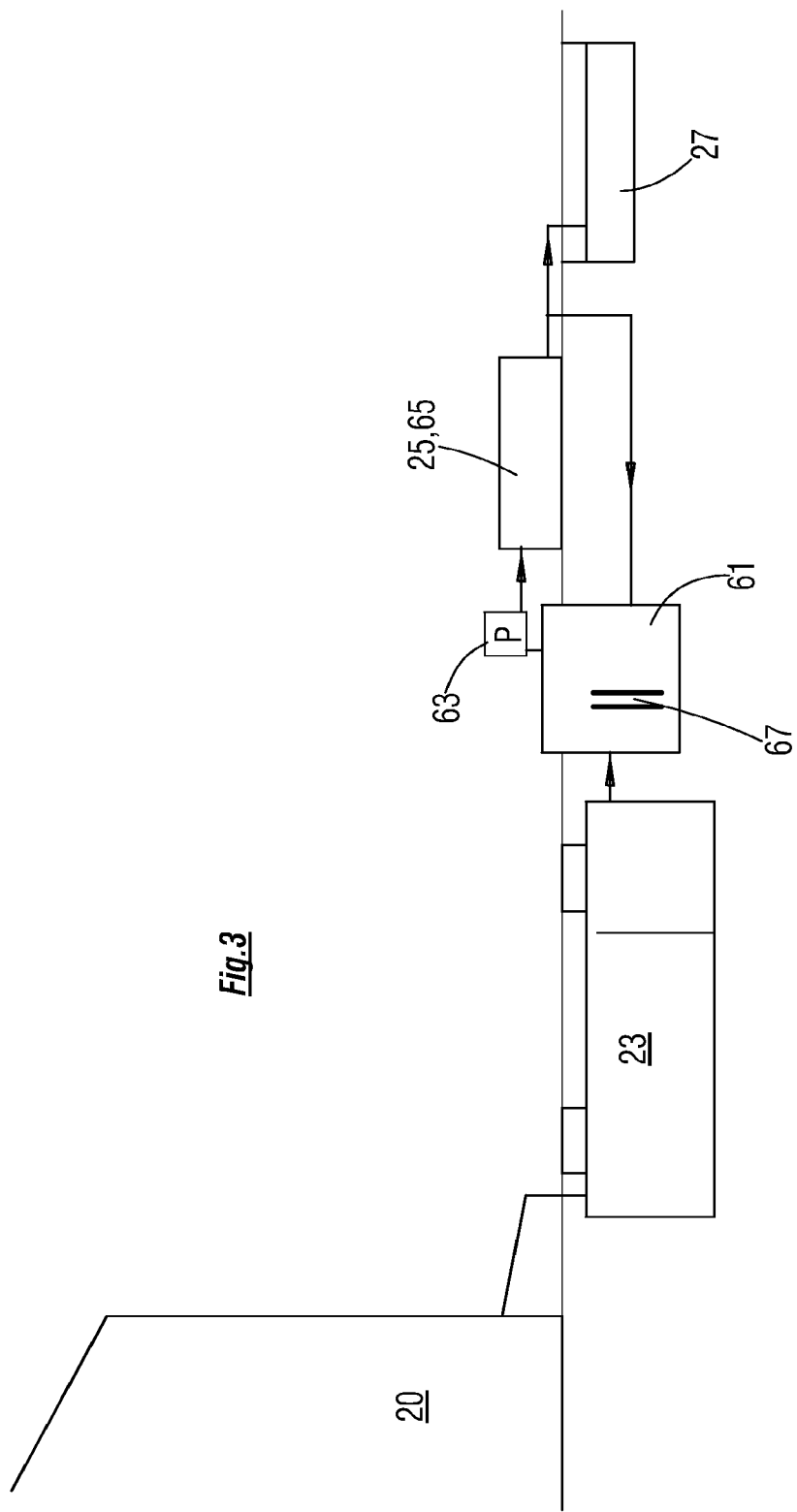

REMOVAL OF PHOSPHORUS FROM SEWAGE BY ELECTRODE METAL ADDITION

This technology relates to the treatment of sewage, and to the removal of dissolved phosphorus from the sewage.

The new technology will be described as it relates to adding a phosphorus-removal station to an existing small sewage-treatment station, typically one in which the sewage is routed first through a predominantly anaerobic station such as a septic tank, and then through a predominantly aerobic station, such as an aerobic soil leach field or biofilter (such as that shown in FIG. 1 of US-2012/0,085,702), and finally to an infiltration or disposal station, where the now-treated sewage water is mechanically infiltrated down into the groundwater or directly into a waterway or lake.

BACKGROUND

A problem with phosphorus arises, for example, when many cottages and other residences are clustered on the shores of a lake, and each has its own individual septic-tank-and-leach-field sewage treatment station. In the absence of phosphorus, algae growth in the lake is kept in balance with other life forms by a scarcity of phosphorus. When extra phosphorus is added, the algal forms can predominate, which depletes the oxygen in the water to the detriment of fish, plants, etc.

Thus, phosphorus in sewage should be prevented from reaching the lake. Increasingly, regulations require that each small sewage treatment station around the lake has to include its own phosphorus-removal facility.

When domestic sewage passes through a traditional septic-tank-and-leach-field treatment station, even though the treatment station is performing properly as regards removal of BOD and suspended solids, nitrification of ammonium, etc, phosphorus in the sewage water is basically left intact. The treated water being infiltrated into the groundwater can contain as much as twenty milligrams of phosphorus per litre of the water.

It is well known that phosphorus in the form of dissolved phosphate can be removed naturally from water entering the groundwater, if the water infiltrates through iron-rich soil. The treated sewage water is released into the groundwater under the infiltration station. The B-horizon of most soils contains iron as different types of iron oxides and hydroxides, and the incoming dissolved phosphate ions combine with the iron oxides to create more reduced ferrous phosphate $Fe_3(PO_4)_2$ or more oxidized ferric phosphate $FePO_4$ minerals (depending on the chemical environment (Eh and pH) of the soil in contact with the water). $FePO_4$ and $Fe_3(PO_4)_2$, for example, are solid minerals of very low solubility, which precipitate. Once mineralized, the mineral is safe, and no further treatment is necessary, in the sense that the mineral basically does not dissolve and does not release the phosphorus into the groundwater. Similar reactions can form between dissolved phosphorus and aluminum and calcium minerals in soils to remove phosphorus from solution.

The transformation of dissolved phosphate-P to solid ferrous oxide-P is non-organic, i.e does not require microbial action (although it is not impeded by microbially-active water). The same conversion of dissolved phosphorus into solid minerals occurs also with respect to aluminum in the soil.

This natural attenuation of phosphorus is fine, when and while it happens. However, although most soils contain iron and aluminum, the content varies, and it is rare for an assessment to be done to determine the metals-content in the soil underneath a small domestic infiltration station. Also, the metals are used up, and not naturally replenished, but again it is rare for follow-up measurements to be done, over the years, to determine the extent to which the metals have been depleted.

It is an aim of the present technology to use powered electrolysis to put iron into solution in the sewage water, thereby to mimic the effect of metals that are present naturally in the soil. (Although other metals (e.g aluminum) can be used in place of iron, the invention is herein described as it relates to the use of iron, as the metal that is put into the wastewater by electrolysis. The aim is to make dissolved iron ions available, in the wastewater, to combine with the dissolved phosphate ions, thereby to form a (solid) iron phosphate mineral, which precipitates. The phosphate mineral can be precipitated in such manner e.g as to be left in the ground, or the mineral can be collected in the treatment station and removed periodically.

The present technology aims to provide a facility for removing dissolved phosphate from wastewater that is capable of being added or incorporated into the kind of small domestic septic-tank-and-leach-field sewage treatment station that exists by the thousands around lakes and other vulnerable waterways.

Desiderata and preferences for such a phosphorus-removal facility may be summarized as follows.

- Given that the existing septic-tank+leach-field station requires regular servicing, the phosphorus-removal facility should be capable of being maintained along with, and at the same times (e.g yearly) as, the normal septic-tank maintenance.
- Given that the existing station might be located at a site with poor road access, the facility should not require more or better access than the existing services.
- The same preference for requiring no more access than the existing station, applies also to the installation of the phosphorus-removal facility. The facility should be capable of being installed by the same level of technicians as perform the regular service calls.
- The facility should not involve the use of toxic materials.
- The facility should have no acidic or caustic pH issues.
- The facility should be non-polluting. The facility should not add anything into the groundwater (even though less polluting than the phosphate).
- The facility should involve low consumption of resources generally, including energy.
- The facility should accumulate and store the removed phosphate in such manner that collection and pickup thereof for disposal can be simple and thorough.
- The facility should not interfere with the efficacy of the regular existing anaerobic+aerobic treatment facilities.
- The facility should not be expensive—to install, to operate, to service.
- The facility should be able to operate automatically and to be adjusted easily according to changes in water consumption and phosphorus concentration in the sewage.
- The facility should be capable of being installed in indoor or outdoor conditions, and should not be influenced by weather changes.
- The facility should not interfere with the efficient operation of the existing sewage system.
- The facility will include replaceable components, such as electrodes, filters, etc, but otherwise the facility should be made to last indefinitely.

The phosphorus-removal facility should be capable of being located in a place where the treatment parameters can be verified, and monitored, if desired. The facility should be capable of being so arranged that the phosphorus-removal function is completed before the treated water enters the ground, or other final discharge point.

Some of the methods commonly used in municipal sewage treatment stations to remove phosphorus are not appropriate for being added or incorporated into domestic septic-tank+leach-field systems. For example, a regime requiring regular addition of chemicals to the wastewater would likely not be practical or feasible for house-owners. Thus, the facility should not require the periodic addition of (even benign) chemicals.

It is recognized, in the invention, that it is possible to create conditions in the cell that favour efficiently driving the electrode metal into solution, without causing redox transformations of other substances in the water, and without electrolyzing the water itself (e.g. electrolytic dissociation of water into hydrogen and oxygen gases). The applied voltage should not be high enough to electrolyze the water, i.e to cause oxygen (gas) to be created at the anode at a significant rate. Green coloration of clear tap water in the electrolytic cell during testing indicates that the iron ions are more reduced than oxidized and that substantial oxygen generation at the anode is not occurring.

It is recognized that it is possible to operate the cell at a voltage that is high enough to cause the metal to enter solution at a worthwhile rate, and yet is low enough that that solubilization is the only significant electrolytic activity in the cell. That is to say, it is recognized that there exists an operational margin of voltage, within which metal solubilization is the only significant electrolytic activity.

It is recognized that a key to operating within this operational margin of voltage is to provide the metal in an easy-dissolve form. It is recognized that, when the metal is in easy-dissolve form, there exists a substantial range of voltage over which the metal dissolves into the water at a worthwhile rate, and yet over which other electrolytic effects are minimal.

It may be regarded that the easy-dissolve form of the metal is a low-electrical-resistance form of the metal. The lower the electrical-resistance of the electrodes, the higher the current-density for a given applied voltage. Thus, a key to procuring a current-density that is large enough to drive the metal into solution at a worthwhile rate, is to make the electrical resistance of the electrodes low, thereby enabling the applied voltage to be low, for a given current-density.

It is recognized also that, when the metal is not in easy-dissolve form, whereby the cell has a high resistance, the voltage that would notionally be required to make the iron dissolve at an economically worthwhile rate then would be so high that the water would start to dissociate, and oxygen would be released at the anode at a high rate.

It is recognized that, unless the metal of the electrodes is in easy-dissolve form, it is substantially not practical to create the conditions under which the metal of the anode can be driven into solution absent substantially any other electrolytic activity.

It may be regarded that, when the metal is in easy-dissolve form, there now exists an operational range of applied voltage, between an upper voltage that is high enough to dissociate the water, and a lower voltage below which the current density is too low to drive iron into solution at a worthwhile rate. In other words, when the metal is in easy-dissolve form, a "window of opportunity" of applied voltage opens up, within which electrolysis can actually and practically be used to drive iron into solution. When the metal is not in easy-dissolve form, such "window" does not exist or is too small to be useful.

In order for the metal to be in easy-dissolve form, the metal should be free from oxide coatings, and free from anything else that will, or might, require the current-density to be raised in order to drive the metal into solution. If the electrolyte were to contain substances that dissociate or solubilize, or otherwise consume electrical energy at voltages below or near the voltage at which the desired metal solubilizes, that would be disadvantageous. It is recognized that, generally, sewage does not contain such substances, in suspension or in solution, or not in any significant proportions.

The preferred metal for us in the invention is cold-rolled mild steel, e.g of the AISI-1018 specification. However, hot-rolled mild-steel is half the price, or less, of cold-rolled. Hot-rolled steel, as manufactured, is not in easy-dissolve form. The hot-rolling process leaves a coating on the steel that makes the iron much more difficult to dissolve by electrolysis. The coating on hot-rolled steel, called mill-scale, is thick, and is complete. Mill-scale comprises a number of iron oxides, including hematite and magnetite, which may be characterized as substantially inhibiting the iron ions from going into solution. Thus, if hot-rolled steel is used, the surface coating should be ground off or otherwise removed. (Removal of the oxides can be done e.g by immersing the iron in an acid-bath.)

The surface of the hot-rolled mild-steel having been cleared off (down to the bare metal), now that steel is in easy-dissolve form. Now, the voltage at which the iron can be made to dissolve at the desired rate is low enough that the iron can enter solution, without substantially any other electrolytic activity taking place.

The rate at which iron enters solution depends largely on the condition of the surfaces of the plates, particularly on the current-surface of the plate, being the surface that faces the other plate. If there is any coating, e.g oxides, on the current-surface, the surface should be subjected to processing, such as grinding or other machining, to remove the coating, and to expose the bare iron, prior to use of the iron as an electrode. Traces of rust on the surface would not be significant; but the surface should not be e.g coated with rust, mill-scale, etc, as that will reduce the rate at which the iron enters solution, for a given applied voltage. Or rather, the presence of oxides will increase the volts needed to achieve the desired current-density. The surfaces should be cleaned of traces of oil, or the like, as would be likely to inhibit electrolytic activity.

If the iron of the electrodes is not easy-dissolve metal, e.g if the metal has a substantial oxide coating, it then becomes impractical to drive the metal into solution. The attempts to dissolve non-easy-dissolve metals fall down because of dissociation of the water. There is some bubbling of gas in the present technology, e.g hydrogen production at the cathode; but when the electrodes are of easy-dissolve iron, despite some minor bubbling, most of the electrical energy at the anode does indeed go into driving the iron ions into solution, and not into electrolyzing the water.

Evidence that oxygen gas is not being released at the anode lies in the fact that the iron enters solution in ferrous form, rather than in the oxidised ferric form. That the ions are ferrous is apparent from a green coloration in the water, even when the electrodes are immersed in oxygen-rich treated effluent. Oxidation to ferric ions can be encouraged by recirculation of electrode water, and produces a red-brown or orange coloration.

Although aluminum might be considered a suitable metal to be used in the electrodes, aluminum is less preferred, on three grounds: (i) aluminum is significantly more expensive than mild steel; (ii) it can be difficult to expose bare aluminum, because aluminum oxides are liable to form instantly and completely; and (iii) the voltage needed to drive aluminum into solution is significantly higher than the voltage needed to drive iron into solution.

Cast-iron (with the as-cast surface machined off) would likely be suitable for use as the easy-dissolve iron. Stainless steel is not suitable, of course, as the easy-dissolve iron.

It may be noted that, in electrolysis systems in which the electrodes are semi- or non-consumable, it is often necessary to add salt to the water to increase its conductivity. In the present case, where the metal electrodes dissolve, the metal ions themselves serve to complete the electrical circuit and make the process independent of the water hardness or conductivity.

The electrodes are immersed in water, preferably totally. When immersed totally, the electrical connections should be made water-tight to prevent corrosion of the wires, which are normally copper. When partially immersed, the connections are easier, but still have to be protected from corrosive gases and wet conditions.

The rate at which the electrolysis-facility supplies dissolved iron ions into the wastewater should be such as to deal with the expected phosphorus content in the sewage, to achieve the desired minimal concentration of phosphorus at the final discharge station, plus a safety margin. It is not practical to measure the amount of phosphorus in the wastewater on a real-time basis. However, because of the long residence time of the water in the septic tank and percolating through the soil or biofilter (typically a week or more), it is not necessary to add iron in quantities to coincide with the maximum amount of phosphorus. Iron should be added to the water as if the phosphorus content were at its expected average, plus a safety margin, all the time. When the phosphorus content is below the average for a period of many days or weeks, some unused iron ions will or might enter the groundwater, or might react with soil particles and be removed from the water. The unused iron ions remain in solution, but iron is ubiquitous in soil, and is not regarded as a pollutant when captured in the soil.

The problem with adding too much iron into the water is not so much that iron is a pollutant, but rather that the iron electrodes might be used up prematurely. It may be noted that adding aluminum sulphate to the water, as a phosphate removal substance, affects the chemistry of the water with respect to pH; adding iron to the water poses no such problem. Proliferation of iron bacteria in a highly aerobic leach field or biofilter could be an issue if the iron content were to reach 100 mg/L or more, but at total iron levels up to thirty mg/L, as in the present case, iron bacteria is not a concern. Minerals forming in the biofilters will occlude the posority to some degree. For a standard house with four people, having a sandy loam leach-field, using strengite ($FePO_4$—$2H_2O$) as metal-phosphate precipitate, the present technology will occlude less than 0.02% of the porosity in the upper 30. cm, over an operational period of twenty years. Biofilters with more porosity, such as peat, foam, textile, will occlude even less than sand.

In order to form iron phosphate, more iron is needed than phosphate, in the ratio of 1.5:1, by mole weight. The average phosphorus content, which has to be catered for, can be e.g ten milligrams per litre of wastewater. Typically, a lakeside house produces sewage to be treated at the rate of 1000 litres per day, containing ten grams of phosphorus. At that, the systems-designers should design the electrolysis-facility to dissolve twenty-seven grams ($56 \times 1.5 \times 10/31$) of iron into the wastewater, per day—being five or six kilograms of iron per year. Thus, the designers should see to it that the iron electrodes are large enough to be diminished by that amount per year (assuming the electrodes can be replaced once a year).

Another common estimate of the amount of phosphorus in sewage is 0.8 kg of phosphorus per capita per year. For a three-person household, that is 2.4 kg phosphorus per year; to mineralize that amount of phosphorus, notionally a mass of 3.6 kg of iron should be dissolved into the wastewater, per year.

The systems-designers can make provision to enable the householder to tailor the amount of iron dissolved into the wastewater according to the amount of phosphorus actually present in the water. Thus, the householder enters a daily average number of occupants over the upcoming period, e.g a week, into the electrical controller. The controller then automatically adjusts the current-density to suit.

In the present technology, the transformation of phosphorus from dissolved phosphate to solid iron-phosphate does not only take place as the water is passing between the electrodes. The transformations occur, not because of the electrolysis, but because of the juxtaposition of the iron and phosphorus ions together in the water. That is to say: the transformations continue as the water passes along its flow-path through the wastewater-treatment-station, downstream of the electrodes.

In the present technology, the Fe ions that have been placed in the wastewater travel downstream along with the $PO_4$ ions already present in the water. Thus, transformations can continue on an ongoing basis, and precipitation of the iron phosphates can take place over the long travel path of the water. Contrast this with a treatment system that relies on passing the phosphate-laden water, without iron mixed in, through a leach-field, where the phosphate is transformed by iron naturally present in the soil material of the leach-field.

The attenuation attributable to passing the phosphate through a static body of iron would be expectedly much less, due to flow-channeling of effluent, for example, passing through widely spaced, linear trenches and down through the most permeable zones. Having the dissolved iron travel along with the dissolved phosphate, with iron phosphate being continually created and precipitated along the way, is considerably more efficient than passing the dissolved phosphate through a static body of iron oxides in a soil.

As the water moves along through the treatment station, downstream of the cell, more of the dissolved phosphate is transformed into solid iron phosphate. The ratio of iron ions to phosphate ions can remain more or less constant, even well downstream of the cell, whereby the transformations can continue. As a result, it can be expected that the final content of dissolved phosphate entering the groundwater or final discharge point will be very low.

The electrical energy to the cell does not need to be switched off when the wastewater is not flowing. When the water is still, it only takes a few minutes for the dissolved phosphate in the small volume of water actually between the electrodes to be completely transformed to the solid mineral. After that, any further iron that enters the water simply remains in solution, ready and waiting to be mixed with the phosphate ions when next the water starts to move. Under normal pH conditions, water becomes saturated with iron at a concentration of about 200 mg/litre. Typically, it would take a few days for the water to become saturated with dissolved iron, and facility can be provided for turning the electricity off if there has been no dosing over such a period. Any iron added to the water when the water is saturated with dissolved iron would simply precipitate, and be stored in the sediment or biofilter, and perhaps be available for future usage.

Polarity of the electrodes is reversed periodically (e.g., daily), so that each electrode alternates between acting as anode and cathode. Alternating polarity minimizes unwanted precipitation of minerals on the electrodes and increases the effective operating time, especially in hard water.

The electrolysis-facility can be placed almost anywhere in the wastewater-treatment-station, e.g: in the sewer leading to the septic tank; in the septic tank; in the re-circulating tank (if there is one); in the aerobic biofilter; or in the leach-field. Alternatively, as mentioned, the electrolysis-facility can be accommodated in its own separate vessel, which may or may not contain wastewater, which is located away from the main treatment station. Just as the electrolysis-facility can be placed at several different points along the flowpath of the the wastewater as it travels through the wastewater-treatment-station, so the cell-water from a separate electrolysis-facility can be directed, likewise, to several different points along the flowpath of the the wastewater as it travels through the wastewater-treatment-station.

In fact, cell-water from a separate electrolysis-facility can be directed to locations along the flowpath of the wastewater in which it would be impractical to place electrodes—such as inside a free-draining aerobic biofilter. The electrolyte water in the separate electrolysis-facility can be supplied tapwater (or collected rainwater) rather into wastewater. Pipes or conduits convey the dissolved-iron-laden cell-water to selected points in the wastewater treatment station.

Designers should bear in mind where the solid phosphate mineral is going to precipitate. If the minerals are to be taken out by filtration, it is better to put the phosphate-filter (and the electrolysis-facility) downstream of the settling tank in which the suspended sewage solids in the wastewater are removed.

Hardness in water can cause precipitation of minerals on electrode surfaces, which can increase electrical resistance in the electrolysis-facility. Thus, when the sewage water contains such minerals, the electrolysis-facility will require more electrical energy. Hardness can make it difficult to dissolve metal ions into the sewage water. More frequent polarity reversal or other means of cleaning may be required in hard water conditions.

If the sewage water is very hard, it can be beneficial to put the iron into solution in water that has not yet entered the wastewater stream. In that case, the electrolyte water in the electrolysis-facility can be tapwater, and the resulting metal-ions-laden tapwater is then mixed into the wastewater stream. (The amount of tapwater is very small compared with the amount of wastewater.) In that case, even though the tapwater and the wastewater are hard, a small water-softening facility can be incorporated into the water supply to the electrolysis-facility, to ensure a good rate of solution of the metal.

Alternatively, the electrolysis-facility can, for example, be supplied with rainwater as the electrolyte water.

Once the iron has been dissolved in the cell-water, in the electrolysis-cell, the cell-water can then be introduced into the wastewater stream at a suitable location. The iron remains in solution, ready to combine with the dissolved phosphate, as the now-mixed waters continue the downstream journey through the wastewater treatment station, and on into the soil underneath the ground-infiltration station, or other form of discharge-station.

It will be understood that the combination reaction between the dissolved metal and the dissolved phosphate does not, and need not, take place in the electrolysis-facility. In fact, as just described, the electrolysis-facility can be supplied with soft clean tap water or rainwater as its electrolyte, rather than wastewater, so that there is no contact between the dissolved metal ions and the dissolved phosphate ions, at all, in the electrolysis-facility. Again, the mineralization of the phosphate takes place when the metal-water is mixed with the phosphate-water.

Some examples showing the application of the present technology to various configurations of wastewater-treatment-station are shown in the accompanying drawings. In each case, the electrolysis-facility is added to an existing small wastewater-treatment-station.

LIST OF DRAWINGS

FIG. 1 shows a simple small wastewater-treatment-station, in which the wastewater passes through a septic-tank and then into a combined aerobic leach-field and infiltration soakaway. The electrolysis-facility is placed outside the wastewater-treatment-station.

FIG. 1A is the same view as FIG. 1, but shows the components of the wastewater-treatment-station without the electrolysis-facility.

FIG. 2 shows the electrolysis-facility located in the septic-tank.

FIG. 3 shows the electrolysis-facility located in a pump tank (recirculation tank), downstream of the septic-tank.

Figure 1B:
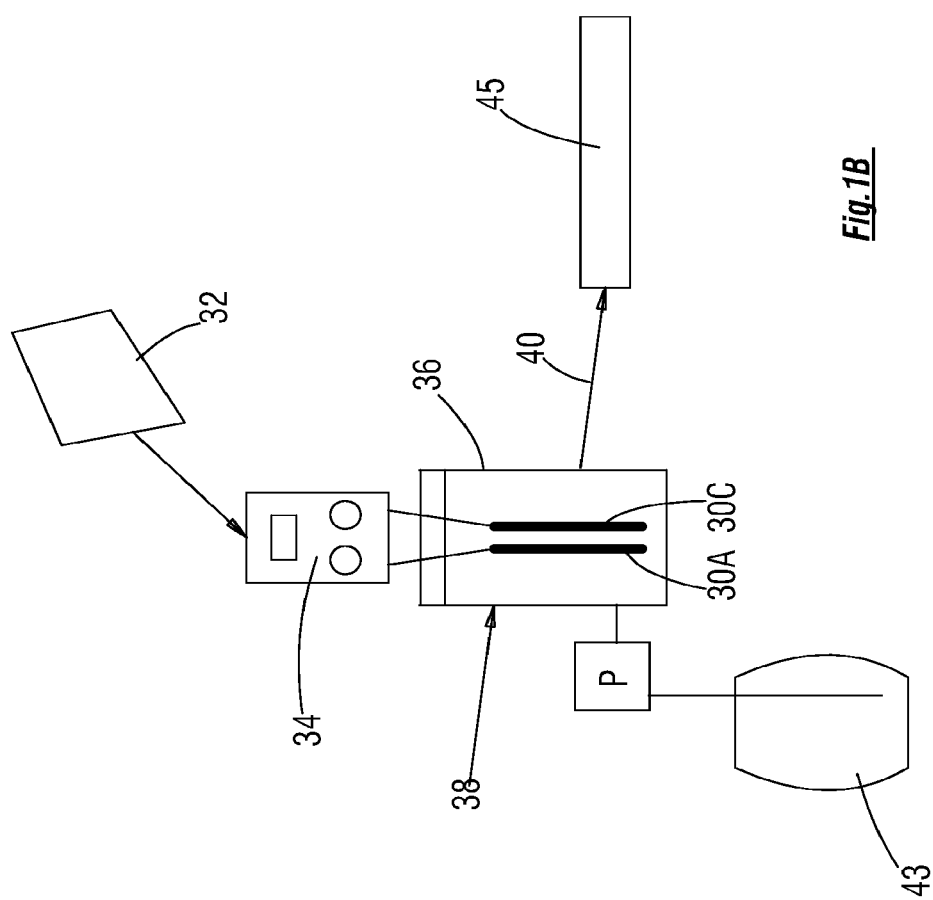
FIG. 1B is the same view as FIG. 1, but shows the components of the electrolysis-facility without the wastewater-treatment-station.

Where access to an existing treatment system is difficult or when contact with potable water only is preferred, the electrodes can be placed above grade or inside an adjacent building in a flooded pipe or tank. The generated iron or aluminum ions are flushed periodically into the treatment unit inlet area using a timed valve release or other suitable means that will preferably direct flow past the electrodes and be energetic enough to remove solids from the electrode chamber. This scenario is depicted in FIG. 1.

Iron-based electrodes are immersed in water or wastewater and connected to a DC current power supply and a controller. There is generally no requirement for pumping or piping when the electrodes are immersed in the wastewater. When immersed in a container of water outside of the treatment system, a mechanism such as a timed valve flushes the contents into a sewer or to the treatment system.

The power supply can be a commercially available unit, a series of batteries, an AC-DC converter, or solar panels that provide DC current in the required voltage for the electrode size and dissolution requirements.

The power through the electrodes is controlled so that the electrode material is consumed evenly for longevity and so that mineral scale build-up precipitated from the water is minimized. The controller may be designed to shut off power to the electrodes when no sewage flow is detected for a period of 3-4 days or more, and then turn on when flow resumes, similar to a demand-controlled water softener appliance. Otherwise, the system can be designed to operate on a dedicated basis like a timed-operation water softener.

The electrode size and configuration is designed according to the volume of wastewater to treat and the concentration of TP expected in the wastewater. With a control mechanism, they are sized to last a year or more at residential sites without replacement, and 3-6 months or more at larger facilities where maintenance visits can be more frequent.

Ferrous ions enter the water or wastewater directly and are oxidized to the ferric state by bubbling air diffusers (active submerged aeration). Depending on the treatment system design, the iron can be added at various points, but typically only one point is necessary for phosphorus removal, provided it allows thorough intermingling of iron and phosphate ions. Treatment scenarios suitable for smaller flows are described below, but the invention is not restricted to these described configurations, nor is it restricted to small flows.

In FIG. 1, wastewater from a house 20 passes through a wastewater-treatment-station. A sewer 21 conveys the water to an in-ground septic-tank 23. Here, heavy solids in the sewage settle on the floor of the tank, and light solids form a scum on the surface. From the septic tank 23, the water is pumped into a biofilter 25, where the water is aerated by trickling down through the biofilter medium, which removes or lowers BOD, and nitrification occurs. The biofilter may be constructed from a variety of materials, including soil, sand, pea gravel, open-cell foam, peat, textiles, or the like. From the biofilter, the water passes to an infiltration-station 27, which includes a soakaway of sand or gravel, to take kinetic energy out of the discharged water, thereby enabling the treated water to enter the ground distributed evenly over the ground.

To this existing conventional wastewater-treatment-station is added a phosphorus removal facility. An electrolysis-facility is arranged to drive iron into solution in the wastewater. The electrolysis-facility includes an electrolytic-cell 29, comprising a pair of electrodes 30 (or, usually, more than one pair), and a source of DC electricity which in this case is a solar panel 32. A controller 34 feeds the electricity into the anode 30A and cathode 30C, and is set to automatically maintain constant current-density in the current-surfaces of the electrodes 30 and to handle the once-a-day reversals of voltage and current.

The controller 34 also controls an (optional) powered pump for moving the cell-water through the cell 29. The generated iron ions are flushed periodically into the water-distributor using a timed valve release, by natural gravity flow of the sewage through the wastewater-treatment-station, or by other suitable means that will preferably direct flow past the electrodes energetically enough to help remove, solids from the electrodes and from the container.

The electrodes 30 are of hot-rolled mild-steel. From the current-surfaces of the electrodes, all oxide and other coatings have been removed by grinding or other methods.

The cell includes a container 36, having an inlet 38 and an outlet 39 for conveying water through the cell. The electrodes are supported on a frame inside the container 36, the frame being arranged to hold the electrodes 30 in the desired spaced-apart relationship.

Cell-water is supplied to the inlet 38, in this case, from a rain-barrel 43. The outlet conveys the iron-laden cell-water to a cell-water-distributor 45, which feeds cell-water to selected locations in the wastewater-treatment-station. As shown, the iron-laden cell-water is fed through pipes to the sewer 22, to the septic tank 23, to the biofilter 25, and to the conduit through which water is conveyed to the infiltration station 27. In fact, it would be usual to send the cell-water to just one location of the wastewater-treatment-station, but the cell-water can easily be sent to the multiple locations if desired. The pipework to move the cell-water is very simple.

The cell-water mixes with the wastewater at the various mixing-points (or single mixing-point). As a result, the iron-ions and the phosphate-ions are brought together, and the transformation to the solid mineral can now start to take place. Once the waters have been mixed, of course they remain mixed for the remainder of the journey through the wastewater-treatment-station, enabling continuing on-going transformations.

As will be understood, the electrolysis-facility is inexpensive and can be sold as a factory-manufactured product, which can be added or incorporated into the existing wastewater-treatment-station very simply. Coupling up the electrical conductors and the water conduits is also very simple. No excavation is necessary, for installation, and very little physical access to the components and treatment stations of the wastewater-treatment-station is required.

In FIG. 2, the cell 50 is not housed in its own container, but rather the cell is placed within the wastewater-treatment-station itself, in this case in the septic tank 23.

The septic-tank can be an advantageous place to locate the electrodes. It is often very convenient and simple to provide a cell-unit that can be physically lowered into and placed inside the septic-tank.

Thus placed, the iron ions start to combine with the phosphate ions actually in the septic-tank. The solid iron-phosphate minerals come out of solution in the septic tank, and a portion of the minerals accumulates in the scum and sludge in the septic tank. The minerals are removed when the septic tank is cleaned out, during regular servicing.

Accumulating the solid minerals in the septic tank may be compared with what happens in known electro-coagulation and electro-flocculation processes—in which the phosphate is removed from solution, and is placed in the septic-tank.

In the known electro-coagulation and flocculation processes, which use strong electric fields and electrically-induced oxidation and reduction reactions, the phosphorus is removed from the wastewater by flocculation and agglomeration of suspended solids to make a sludge, and then by physical separation of this sludge. The phosphorus still remains as a pollutant in the sludge. In the known processes, the sludge must be removed periodically and the phosphorus therein still remains to be treated, again, at another treatment facility.

In the present technology, the low energy input (just enough to dissolve the iron at an adequate rate) means that the phosphorus collected as sludge in the septic tank solids is minimized, and also the coagulation and agglomeration of solids is minimized. Thus, most of the sewage phosphorus is mineralized, not in the septic tank, but in the treatment stations of the wastewater-treatment-station downstream of the septic tank, e.g in the biofilter. The iron-phosphate minerals precipitate as a fine coating on e.g the biofilter medium material. The phosphorus is thereby permanently and safely removed from the wastewater. The present technology departs from the known practices of flocculating the metal and phosphorus as sludge, of separating, storing, collecting, managing, the sludge, and having to incur the additional cost of treatment at the sludge management facility.

In the present technology also, when the electrodes are placed in the septic-tank, the water leaving the septic-tank contains the reacted iron-phosphate molecules predominantly as non-flocculent microscopic mineral particles. A portion of the untreated iron-ions and phosphate-ions will be present, and as that mixed-iron-phosphorus-water passes out of the septic tank, and passes downstream through the subsequent stations of the wastewater-treatment-station, the ions have ample opportunity to continue to combine, and to precipitate out as e.g stable mineral coatings on available surfaces. The ions also can continue to combine as the water passes through the infiltration station, and into the ground.

Typically, in the present technology, in FIG. 2, more than half of the overall transformation of the dissolved or microscopic particulate phosphate into solid phosphate mineralization takes place after the water leaves the septic-tank. Thus, in FIG. 2, where the electrodes are placed in the septic tank, the amount of phosphorus that accumulates in the septic-tank is much smaller than the amount of phosphorus that accumulates in the septic-tank in the known electro-coagulation and electro-flocculation systems.

When the cell-unit 50 is located in the septic tank, it can be placed towards the downstream end of the tank, just before the water leaves the tank, or (as shown) towards the entry end. Using the present technology, a proportion of the phosphorus will be mineralized actually within the septic-tank and will settle into the sludge on the floor of the septic-tank. The rest of the phosphorus will be present (with the dissolved iron) in the water flowing out of the septic-tank, and through the subsequent treatment stations, and out, through the discharge-station, into the ground, or into a stream, etc.

The mineralization of the phosphorus continues as the water makes its way along its flow-path through the wastewater-treatment station. By placing the cell-unit 50 at the entry end of the septic tank, the systems designers can maximize the percentage of phosphorus that remains (in solid mineral form) in the septic-tank; by placing the cell-unit at the downstream end, the proportion of the phosphorus that precipitates in the downstream treatment stations can be maximized.

In FIG. 2, the cell-unit 50 includes an insulative frame for supporting the electrodes, now in the form of a support-cage. The support-cage 52 mounts the electrodes 30A,30C in a parallel spaced-apart relationship, and electrically insulated from each other. The support-cage 52 is of open construction, to allow water to pass over and between the electrodes.

The cell-unit 50 includes electrical connections, by which the electrodes can be connected to the electrical control panel 34 of the electrolysis-facility, and thereby to the electrical source.

As a coordinated whole structure, the cell-unit 50 has the capability to be picked up and handled as a unit, to be inserted into the wastewater-treatment-station at a point along the flow-path, to be connected electrically to the controller, and to be mounted in and left in the wastewater-treatment-station for an operational period of at least several months.

In the inlet area of a septic-tank, 50% to 80% of the total phosphorus can be in the form of soluble phosphate ions available for reaction with iron ions. At the downstream effluent end, the proportion can rise to 70% to 80%. After aerobic filtration treatment, this ratio can be expected to rise to 90% or more. Transformations to both ferrous and ferric iron-phosphate minerals can take place, and both minerals are stable and safe.

The electrodes should be submerged in the middle "clear" zone of the septic-tank, to avoid sludge and scum, and along the flow-path of the sewage to disperse the iron and promote reaction between iron and phosphate ions. The strength of the electromagnetic field set up around the electrodes is insignificant so that corrosion of concrete or reinforcing steel in a tank is not a concern.

The septic tank inlet area provides the benefit of longer residence time and potentially more retention of Fe—P mineral suspended solids in scum or sludge, but care must be taken to keep e.g., toilet paper from accumulating on the electrodes in the inlet area. 50% to 60% of total-phosphorus may be retained in the septic tank by coagulation, flocculation, and solids separation, lowering the P-loading on subsequent treatment components such as biological filters or leach fields, or where allowed lowering the P-loading to surface water bodies. The P is retained as low-solubility minerals in the solids, as in $Fe_3(PO_4)_2$, and removed from the site when the septic tank has its regular pump-out maintenance. The electrodes are preferably placed where water flows past them, e.g under the influent pipe.

Placing the electrodes in the outlet location lowers the residence time for reactions to take place, and will have less TP retained in the tank. However, it has the advantage of the electrodes being in clearer water with fewer potential operational problems. The septic tank must be periodically pumped out to remove its proportion of the entrained P-rich coagulant solids, but the frequency of pump-outs will not be increased with the very low volume of sludge created by the addition of iron ions to the system.

The following reports an actual test. A standard single-pass sand filter, constructed of 100% C-33 type medium grained sand, but with no easy-dissolve electrode, removed only 20-25% of the TP from the sewage after septic tank and after e.g a metre of filtration.

In a second test, a soil filtration system constructed of 60% C-33 sand and 40% silt loam might be expected to remove TP to a level of about 0.2-0.5 mg/L within 15-30 cm depth, by itself, at least for an unknown period of time. Adding an easy-dissolve iron electrode system to the inlet end of the septic tank enabled 15 cm of the 60-40 mix to lower TP to a level of 0.2 mg/L within 60 days of operation, steadily increasing the removal rate to 0.05 mg/L TP within 8-9 months.

In this second test, the septic tank effluent removed about 30% TP in the first five months, then about zero percent in the second five months. The initial good removal in the septic tank, during start-up of the electrode system, was followed by a fall-off, likely due in part to the lack of scum in the tank during the later period. This minimal removal in the septic tank (with effluent median values of total phosphorus of 6.0.mg/liter and total iron of 8.2.mg/L) suggests that phosphorus does not necessarily have to concentrate in the septic tank to undesirable levels (in contrast to what happens in the known electro-coagulation technologies, using the septic tank to store the phosphorus-rich sludge). Almost all of the phosphorus was removed in the soil filter as insoluble mineral coatings, with no need for further treatment or disposal.

Over the on-going 10-month study, median TP values of the 12", 24" and 36" pan lysimeter effluents were 0.09, 0.04, and 0.02 mg/L, removal rates of 99% or more. Total iron values in the soil effluents were 0.4-0.8 mg/L similar to the 0.9 mg/L median value of the raw sewage, and down from the 8.2 mg/L in the septic tank effluent following the easy-dissolve iron electrodes.

These studies indicate that dissolution of iron into septic tank effluent or into partially treated effluent increases the removal rate of phosphorus substantially over standard sand and soil filtration systems. The process is precipitation of iron-phosphorus mineral coatings on the sand or soil filtration medium, removing it from the water permanently.

Sludge production and sludge management to concentrate and relocate the phosphorus is not required. Nor is re-treatment.

Studies using synthetic plastic foam medium in the biofilter section show a similar removal rate of phosphorus. In a third test, on a retrofitted school sewage system, the median value of the treated effluent was 0.4 mg/L TP, down from 7.1 mg/L in the raw sewage for a 94% removal rate. The final effluent contained 0.4 mg/L Fe, same as the 0.4.mg/L in the influent sewage, and down from 8.8 mg/L in the septic tank effluent following the easy-dissolve iron electrodes. Reddish coloration in the foam biofilter, without sludge accumulation, indicates iron-phosphate mineral precipitation process is active. The pH of the treated effluent was 7.2, similar to the raw sewage value of 7.3. The septic tank removed about 55% TP consistently over the first 7-8 months, presumably as sludge. The remainder of the phosphorus was removed in the foam biofilter as a reddish coating.

Alternatively, the electrodes can be placed at some other location of the wastewater-treatment-station. But generally the other containers/conduits/tanks/stations of the wastewater-treatment-station are not so accommodating of the cell-unit as the septic-tank. On the other hand, the electrodes being located downstream of the septic-tank, of course none of the solid phosphate mineral collects in the septic-tank.

In FIG. 3, the effluent from the septic-tank 23 passes into a pump tank 61 that doses the disposal leach field or a biological filter plus a smaller leach field. A pump 63 doses water from the pump tank into a recirculating sand filter 65, with a large component of filter-treated effluent returning back to the pump tank 61, typically to dilute strong sewage or to remove nitrate by denitrification. A benefit of putting the cell-unit 67 in the pump/recirculation tank 61 is that the tank typically has adequate space for the unit and contains cleaner wastewater with no appreciable sludge, scum or raw sewage to interfere with the electrodes.

The cell-unit 67 can be placed in the pump tank 61 if the tank is large enough, and the unit should be located deep enough that the water level drop during pumping does not excessively expose the electrodes on a regular basis. The electrodes should be away from metal components and physically constrained to prevent contact and short-circuiting.

A benefit of the pump tank location is that a small side-flow of water from the pump 63 can be directed at the electrodes during pumping to help dispersal and mixing of the iron ions to react with the phosphate ions, and thereby minimize solids accumulating on the electrodes.

It should be noted that the "mixing" of the ions generally need not be assisted by a mechanical mixing device. The mixing can take place by diffusion, by mildly turbulent flow, by turbulence near a pump, by gravity-flow from or into a pipe, etc.

A substantial voltage increase indicates the end of electrode service life or unusual scale build-up on the electrode surface. In this case, the electrode needs to be cleaned or replaced.

The electrodes are preferably placed where water flows past them, i.e under the pipe for re-circulated filtered water.

The following reports a fourth actual test. Testing was carried out over several years on a recirculating sand filter, with coarse pea gravel as a filter medium, showed that little to no phosphorus attenuation had occurred. Treated effluent contained 5-6 mg/L TP, down only from 6-7 mg/L TP in the raw sewage, most likely contained in the septic tank sludge. Adding an easy-dissolve iron electrode system to the recirculation tank, which received about 80% treated effluent and about 20% septic tank effluent, removed phosphorus to a level of 0.4-0.5 mg/L TP in the effluent, or 90-95% removal. Red coloration of the pea gravel indicates that ferric phosphate minerals coated the pea gravel, thereby removing TP by mineralization, and without the need of sludge production to remove the phosphorus. When the electrode was disconnected, residual iron on the filter medium removed additional phosphorus from the water, over a period of two months, as the concentration climbed from 0.5 mg/L to 6.0 mg/L, where it remained. This testing shows that placing the electrodes after the septic tank can remove almost all the phosphorus permanently as mineral coating precipitates in the biofilter station, where the phosphorus does not have to be managed or treated again.

In the technology described herein, the major function of the electrolysis is to cause metal to dissolve into the wastewater. It is not an intended function of this electrolysis to energize treatment reactions; in fact it is intended to avoid energizing reactions upstream of the biofilter station. Nor is it intended to dissociate the water into hydrogen and oxygen for treatment purposes. Insofar as those things happen (i.e cannot be avoided) in the present system, the energy thus consumed can be regarded as an inefficiency.

PRIOR ART

Electrolysis has been featured in previous systems for attenuating phosphorus from wastewater. In US-2012/0,138, 482 (Premier Tech/Fanfan, 7 Jun. 2012), electrolysis is employed to aid electro-coagulation and electro-flocculation of metal-phosphate, in which the phosphorus is taken out of the water by producing a sludge. The sludge is separated out by laminar plates and fed back into the septic tank, where the phosphorus remains, ready to be pumped out with the sewage sludge, e.g every one to five years. This is unlike the present system in that, in '482, the phosphate has not actually been removed from the water by mineralization, but has been concentrated and moved as a sludge from one vessel to another upstream. In '482, the accumulation of phosphorus in the sludge can be very high, e.g in the thousands of mg/L overall. Even a large municipal water treatment plant has difficulty dealing with such phosphorus concentration, and will likely impose surcharges, or even refuse to take the sludge.

Again, in the present technology, the aim is to use electrolysis predominantly to cause metal to enter into solution, whereby the metal ions can mix with the phosphorus ions, and form stable solid metal phosphate minerals. The aim is to do so without the need for electro-coagulation and sludge management. Such a build-up of total phosphorus (TP) in the septic tank could very well increase the concentration of TP leaving the septic tank from normal 6-10 mg/L values to perhaps 5-10 times that, confounding the phosphorus removal technology, and concentrating TP in the septic tank contents to e.g 100-1000 times that. In '482, there is no disclosure of the metal being an easy-dissolve metal, as described herein. There is no disclosure in '482 of minimizing sludge formation or of encouraging metal-phosphorus mineral coatings.

In U.S. Pat. No. 6,645,366 (Iseki, 2003), a catalyst is associated with the electrodes. Again, there is no disclosure of the metal being an easy-dissolve metal, as described herein. There is no disclosure of moving mixed-iron-phosphate-water through the treatment station to a ground infiltration station. There is no disclosure of minimizing sludge formation or of encouraging metal-phosphorus mineral coatings.

In U.S. Pat. No. 6,719,893 (Sakakibara, 2004), the treatment involves electrolyzing the water, rather than causing a metal electrode to dissolve into the wastewater. Again, there is no disclosure of the metal being an easy-dissolve metal, as described herein. There is no disclosure of minimizing sludge formation or of encouraging metal-phosphorus mineral coatings.

The list of reference numerals used in this specification is:

20 house (FIG. 1A, FIG. 1)
21 sewer
23 septic tank
25 biofilter
27 infiltration station
29 electrolysis cell (FIG. 1B, FIG. 1)
30A anode
30C cathode
32 solar panel
34 electrical control panel
36 container for cell
38 container inlet
40 container outlet
43 rain-barrel
45 cell-water-distributor
50 electrolysis-cell unit (FIG. 2)
52 support cage for supporting electrodes in cell
61 recirculation tank (pump tank) (FIG. 3)
63 pump
65 recirculating sand filter
67 electrolysis-cell unit

We claim:

1. A process for removing phosphorus from sewage waste water in a waste water treatment system comprising:
   (a) flowing sewage waste water to be treated through a septic tank anaerobic station from an anaerobic station inlet to an anaerobic station outlet, the anaerobic station comprising a volume in the sewage waste water which, in use, has a clear zone being substantially clear of sludge and scum and through which the sewage waste water flows to the anaerobic station outlet, the sewage waste water comprising phosphate ions;
   (b) conducting electrolysis in the septic tank anaerobic station in the clear zone to provide metal ions to the sewage waste water,
   (c) withdrawing the sewage waste water from the anaerobic station wherein more than half of the metal ions and the phosphate ions are present in the sewage waste water, wherein the metal ions and the phosphate ions combine to form a metal phosphate mineral, whereby formation of a sludge containing metal-phosphate mineral in the anaerobic station is reduced; and
   (d) subsequently passing the sewage waste water through a biological filter positioned downstream of the anaerobic station wherein metal-phosphate minerals comprise a precipitate that is removed from the sewage waste water by the biological filter.

2. The process of claim 1, further comprising selecting the metal ions from at least one of aluminum ions and iron ions.

3. The process of claim 1, wherein the biological filtration station is comprised of peat, soil leach field, textile, filter sand, pea-gravel or plastic foam media.

4. The process of claim 1, further comprising selecting iron ions as the metal ions.

5. The process of claim 1, further comprising selecting ferrous iron ions as the metal ions.

6. The process of claim 1, wherein the metal-phosphate compounds in the sewage waste water downstream of the anaerobic station and upstream of the biological filter comprise non-flocculent microscopic mineral particles.

7. The process of claim 1, wherein metal which produces the metal ions in the clear zone is introduced separately from the sewage waste water into the anaerobic station.

8. The process of claim 1, wherein metal which produces the metal ions in the clear zone is introduced upstream of an electrolysis zone in which electrolysis occurs.

9. The process of claim 1, wherein the metal ions are periodically introduced into the anaerobic station.

\* \* \* \* \*